United States Patent
Jotaki

(10) Patent No.: US 8,985,591 B2
(45) Date of Patent: Mar. 24, 2015

(54) SEALING APPARATUS

(75) Inventor: Naohiro Jotaki, Tokyo (JP)

(73) Assignee: NOK Corporation, Tokyo (JP)

( * ) Notice: Subject to any disclaimer, the term of this patent is extended or adjusted under 35 U.S.C. 154(b) by 243 days.

(21) Appl. No.: 13/582,713

(22) PCT Filed: Jan. 18, 2011

(86) PCT No.: PCT/JP2011/050724
§ 371 (c)(1),
(2), (4) Date: Sep. 4, 2012

(87) PCT Pub. No.: WO2011/108298
PCT Pub. Date: Sep. 9, 2011

(65) Prior Publication Data
US 2012/0319359 A1 Dec. 20, 2012

(30) Foreign Application Priority Data
Mar. 4, 2010 (JP) ................................ 2010-047352

(51) Int. Cl.
*F16J 15/16* (2006.01)
*F16J 15/32* (2006.01)

(52) U.S. Cl.
CPC ............. *F16J 15/3208* (2013.01); *F16J 15/16* (2013.01)
USPC ...................................................... 277/589

(58) Field of Classification Search
CPC ......... F16J 15/16; F16J 15/164; F16J 15/166; F16J 15/185; F16J 15/3208
USPC ......................................... 277/436–439, 589
See application file for complete search history.

(56) References Cited

U.S. PATENT DOCUMENTS 3,663,024 A    5/1972 Traub
7,478,815 B2   1/2009 Jordan
(Continued)

FOREIGN PATENT DOCUMENTS

| CN | 101408248 A | 4/2009 |
|----|-------------|--------|
| CN | 201250905 Y | 6/2009 |

(Continued)

OTHER PUBLICATIONS

International Patent Application No. PCT/JP2011/050724: International Search Report dated Feb. 15, 2011, 5 pages (English Translation Included).

(Continued)

*Primary Examiner* — Vishal Patel
(74) *Attorney, Agent, or Firm* — Baker & Hostetler LLP

(57) ABSTRACT

Provided is a sealing apparatus which can reduce the torque of a rotary portion while always exhibiting a stable and high sealing performance even when a high fluid pressure is being applied. A seal ring (4) inclines when subjected to a hydraulic pressure (P) and a pressing force by a D-ring (3), and stabilizes in a state where an entire opposite pressure-side taper surface (4c) is in contact with an opposite pressure-side side surface (5b) of an annular groove for sealing (5). With the hydraulic pressure (P) being applied to a portion (4b1) of the inner peripheral surface (4b) of the seal ring (4) where an operating oil comes into contact, a space between the portion (4b1) and a shaft (2) is enlarged, and an area of contact between the seal ring (4) and the shaft (2) is reduced. Thus, the torque can be reduced. Furthermore, since the outer peripheral surface (3a) of the D-ring (3) is a surface having a cylindrical shape, the operating oil is not allowed to enter between the D-ring (3) and a bottom surface (5a) of the annular groove for sealing (5) even when the hydraulic pressure (P) is being applied, and the entirety of the outer peripheral surface (3a) of the D-ring (3) always remains in contact with the bottom surface (5a) of the annular groove for sealing (5). Thus, the sealing device always exhibits a stable sealing performance.

4 Claims, 2 Drawing Sheets

(56) References Cited

U.S. PATENT DOCUMENTS

| | | |
|---|---|---|
| 2002/0084593 A1 | 7/2002 | Baehl et al. |
| 2005/0218606 A1* | 10/2005 | Sakazaki et al. ............. 277/627 |
| 2006/0272498 A1* | 12/2006 | Fischer ....................... 92/165 R |
| 2009/0166979 A1* | 7/2009 | Horie et al. ................... 277/529 |

FOREIGN PATENT DOCUMENTS

| | | |
|---|---|---|
| JP | 3-104564 | 10/1991 |
| JP | 4-056269 | 5/1992 |
| JP | 11-248003 A | 9/1999 |
| JP | 2005-504237 | 2/2005 |
| JP | 2005-054827 | 3/2005 |
| JP | 2006-342972 | 12/2006 |
| JP | 2007-092791 | 4/2007 |

OTHER PUBLICATIONS

China Application No. 201180078311.6; Office Action; dated May 29, 2014; 13 pages.

Japan Application No. 2011-538777; Office Action; dated Nov. 4, 2014; 6 pages.

* cited by examiner

SEALING APPARATUS

CROSS-REFERENCE TO RELATED APPLICATIONS

This application is the National Stage of International Application No. PCT/JP2011/050724, filed Jan. 18, 2011, which claims the benefit of Japanese Patent Application No. 2010-047352, filed Mar. 4, 2010, the disclosure of which is incorporated herein by reference in its entirety.

TECHNICAL FIELD

The present invention relates to a sealing apparatus provided at a rotating portion of various machines such a machining tool or a construction machine, and particularly relates to a sealing apparatus having an improved sealing performance for a rotating part which is subject to a high fluid pressure and rotates with a low torque.

BACKGROUND ART

Recently, in the field of machine tools, from an improved operation efficiency point of view, there is a need for a higher operational speed for a portion driven by fluid pressure such as hydraulic pressure, and from an improved mechanical efficiency point of view, there is a need for a reduction in a torque of a rotating portion which rotates while preventing leakage of a fluid.

Under such a circumstance, various types of sealing apparatus have been proposed have been proposed which have an improved sealing performance for a rotating portion which is subject to a high fluid pressure and rotates with a reduced torque.

As an example, as shown in FIG. 2A, there is a sealing apparatus in which, in order to seal an annular gap S formed between two inner and outer members 11 and 12 that coaxially rotate relative to each other, an O-ring (backup ring) 14 and a seal ring 15 fitted on its inner side are installed in an annular groove for sealing 13 which is formed on an inner surface portion of a shaft hole 11a of a first member (outer member) 11 along a peripheral direction, and inclined faces 15a, 15b are formed in a sliding surface of the seal ring 15 against a second member (inner member) 12 at both sides in an axial direction (a direction in which a fluid pressure P is applied). As shown in FIG. 2B, with such a sealing apparatus, when the fluid pressure P is applied, a fluid enters between the inclined surface 15a, which is on a side that comes into contact with an operating fluid (opposite pressure side), and the second member 12. Accordingly, an area of contact between the seal ring 15 and the second member 12 decreases and a frictional resistance between the seal ring 15 and the second member is reduced. Thus, an increased sealing performance and a reduced torque of the rotating portion can be achieved at simultaneously. (For example, see Patent Document 1).

DOCUMENT LIST

Patent Document(s)

Patent Document 1: Japanese Laid-Open Patent Application No. 2005-504237

SUMMARY OF INVENTION

Technical Problem

However, in the aforementioned sealing apparatus of the related art, since an O-ring is used as the backup ring 14, there is an insufficient contact between the backup ring 14 and the bottom surface 13a of an annular groove for sealing 13. When a high fluid pressure P is applied, a space between the backup ring 14 and the bottom surface 13a of the annular groove for sealing 13 becomes larger on a side in contact with the operating fluid, and thus the contact between the two will become more insufficient. As a result, there may be a case where an elastic restoring force of the backup ring 14 does not effectively act as a pressing force that urges the seal ring 15 towards the second member 12 and thus there was a problem that the sealing performance becomes unstable.

An object of the present invention is to provide a sealing apparatus which can always exhibit a stable and high sealing performance while achieving a reduction in the torque of the rotation portion, even when a high fluid pressure is applied.

Solution to Problem

In order to solve the aforementioned problem, according to an aspect of the invention, a sealing apparatus for sealing an annular gap formed between two inner and outer members that coaxially rotate relative to each other is provided which includes a backup ring provided in contact with a bottom surface of an annular groove for sealing, the annular groove for sealing being formed along a peripheral direction in one of the members and having a rectangular cross section, and a seal ring provided on an opening side of the annular groove for sealing, the seal ring being in sliding contact with the other member through an entire periphery by being pressed by the backup ring and rotationally slidable relative to the other member, a contact surface of the backup ring against the bottom surface being a surface having a cylindrical shape and a contact surface of the backup ring against the seal ring being a toric convex surface having a constant radius of curvature in an axial direction, a contact surface of the seal ring against the backup ring being a surface having a cylindrical shape and a contact surface of the seal ring against the other member being a toric convex surface having a constant radius of curvature in an axial direction.

Exemplary two inner and outer members that coaxially rotate relative to each other are a shaft and a housing. In a case where an annular groove for sealing is provided on the housing, a seal ring is installed at an inner peripheral side of the backup ring and slides on (an outer peripheral surface of) a shaft by being subject to a radially inward pressing force exerted by the backup ring. Conversely, in a case where the annular groove for sealing is provided on the shaft, the seal ring is provided on the outer peripheral side of the backup ring and slides on (an inner peripheral surface of) the housing by being subject to a radially outward pressing force exerted by the backup ring.

When an operating fluid pressure is applied to the sealing apparatus of the aforementioned configuration, the backup ring and the seal ring are pressed against a side surface of the annular groove for sealing, which is formed in one of the members, on an opposite pressure side, i.e., on a side where it does not come into contact with the operating fluid. Also, the backup ring is subject to an elastic compression due to the operating fluid pressure and presses the seal ring towards the other member side by an elastic restoring force thereof.

Since the seal ring is configured in such a manner that its contact surface against the backup ring is a surface having a cylindrical shape and its contact surface against the other member is a toric convex surface having a constant radius of curvature in an axial direction, the seal ring inclines by being subject to the operating fluid pressure and the pressing force by the backup ring and causes its end surface on the opposite pressure side to come into surface contact with a side surface on the opposite pressure side of the annular groove for sealing, and stabilizes at a position where an opposite pressure side portion of the inner peripheral side comes into surface contact with the other member. Then, with the operating fluid pressure being applied on a portion of the inner peripheral surface of the seal ring in contact with the operating fluid, a space between such a part and the other member becomes larger and an area of contact between the seal ring and the other member becomes smaller. As a result, a high sealing performance can be ensured since the pressure force of the backup ring concentrates on a portion of the seal ring in contact with other member, and a reduction in the torque of the rotation portion can be achieved since a frictional resistance between the seal ring and the other member is reduced.

Since the contact surface of the back ring against the bottom surface of the annular groove for sealing is a surface having a cylindrical shape, even when a high operating fluid pressure is applied, the operating fluid is not allowed to enter between the backup ring and the bottom surface of the annular groove for sealing, the entire contact surface of the backup ring against the bottom surface of the annular groove for sealing always remains in contact with the bottom surface of the annular groove for sealing. In other words, since both the bottom surface of the annular groove for sealing and the contact surface of the backup ring against such bottom surface are surfaces each having a cylindrical shape, no gap is produced between the two surfaces. Therefore, with the elastic restoring force of the backup ring being always effectively acting as a pressure force that urges the seal ring towards the other member side, a stable sealing performance can be always achieved.

In the sealing apparatus according to an aspect of the invention, it is preferable that the backup ring is a D-ring made of rubber, and the seal ring is a resin ring made of one of polyethylene and polyamide.

By employing a D-ring made of rubber as the backup ring, the seal ring can be inclined while applying a moderate pressure force due to rubber elasticity to the seal ring. By employing a resin ring made of polyethylene or polyamide as a seal ring, a wear of the D-ring made of rubber due to friction between the two rings can be minimized while maintaining a durability of the seal ring against a high fluid pressure and a slidability against the other member.

In the sealing apparatus of the aspect of the invention, it is preferable that an end surface of the seal ring has a tapered face which inclines in such a manner that a distance from a side surface of the annular groove for sealing becomes larger towards the bottom surface of the annular groove for sealing.

With such a configuration, when the seal ring is inclined by being subject to an operating fluid pressure and a pressing force due the backup ring, an end surface of the seal ring on an opposite pressure side has a good surface contact against a side surface of the annular groove for sealing on the opposite pressure side, and thus a more stable sealing performance can be achieved.

Advantageous Effects of Invention

According to a sealing apparatus of the present invention, even when a high fluid pressure is being applied, a stable sealing performance can be always achieved by always effectively applying an elastic restoring force of the backup ring as a pressing force that urges the seal ring, and a reduced torque of the rotation portion can be achieved by reducing a frictional resistance by the seal ring.

DESCRIPTION OF THE PREFERRED EMBODIMENTS

Hereinafter, embodiments of the present invention will be described.

Figure 1A:
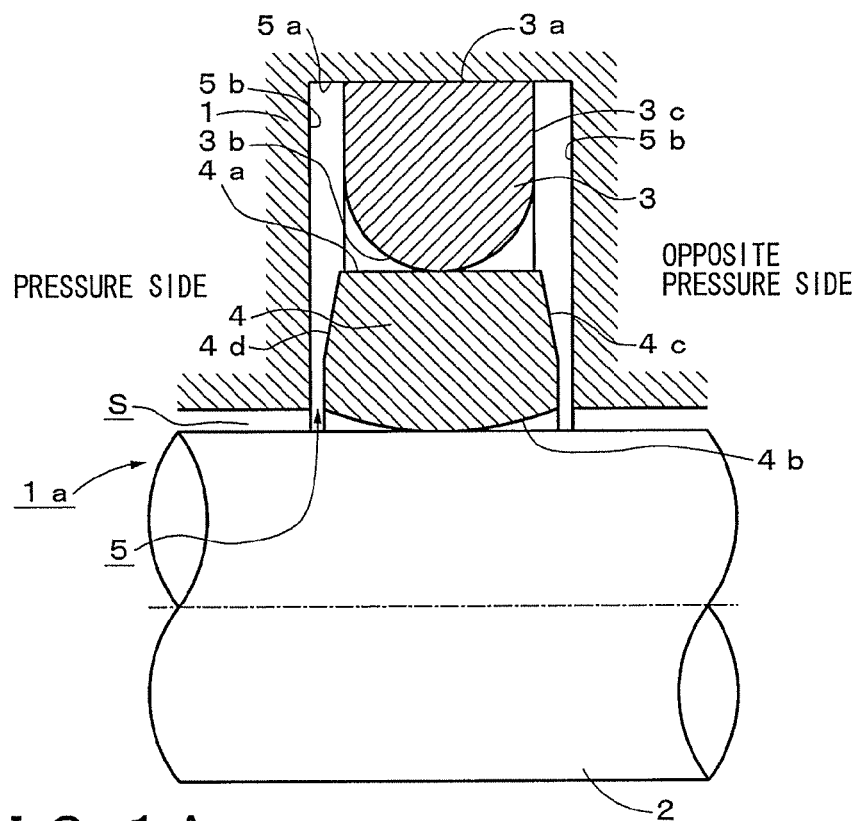
FIG. 1A is a partial sectional diagram of an embodiment of a sealing apparatus of the present invention illustrating a state of a backup ring and a seal ring while a fluid pressure is not being applied.

A sealing apparatus of the present embodiment is applicable to a rotating portion of a hydraulic machining device and the like, and, as shown in FIG. 1A, seals an annular gap S formed between a housing (one member) 1 and a cylindrical shaft (the other member) 2 inserted through a shaft hole 1a in the housing 1 while allowing a relative rotation between the two members 1 and 2.

This sealing apparatus has a D-ring (backup ring) and a seal ring 4. Both rings 3 and 4 are installed in an annular groove for sealing 5 that has a rectangular cross section and formed in an inner surface portion of the shaft hole 1a along a peripheral direction.

The D-ring 3 is provided in contact with a bottom surface 5a of the annular groove for sealing 5. The D-ring 3 is a sealing member made of rubber and having a substantially D-shaped cross section, with its outer peripheral surface 3a being a surface having a cylindrical shape similar to the bottom surface 5a of the annular groove for sealing 5 and its inner peripheral surface 3b being a toric convex surface having a constant radius of curvature in an axial direction.

The seal ring 4 is a sealing member made of resin of polyethylene or polyamide, with its outer peripheral surface 4a being a surface having a cylindrical shape and its inner peripheral surface 4b being a toric convex surface having a constant radius of curvature in the axial direction. An axial-direction radius of curvature of the inner peripheral surface 4b of the seal ring 4 is selected to be smaller than an axial-direction radius of curvature of the inner peripheral surface 3b of the D-ring 3. The seal ring 4 is provided in a tightly fit manner against the inner peripheral surface 3b of the backup ring 3 through an entire periphery, and rotationally slide relatively while being tightly pressed in contact with an entire periphery of an outer peripheral surface of the shaft 2.

An inner diameter size of the D-ring 3 is substantially equal to an outer diameter size of the seal ring 4, and the D-ring 3 and the seal ring 4 are installed in the annular groove for sealing 5 in a state where they are in close contact with each other. When installed, the D-ring 3 is interposed between the seal ring 4 and the bottom surface 5a of the annular groove for sealing 5, and compressed in a radial direction. An elastic restoring force of the D-ring 3 acts as a pressing force that urges the seal ring 4 towards the shaft 2. On both end surface portions of the seal ring 4, tapered faces 4c and 4d are formed in such a manner that a distance from a side surface 5b of the groove 5 becomes larger as towards the bottom surface 5a of the annular groove for sealing 5.

Figure 1B:
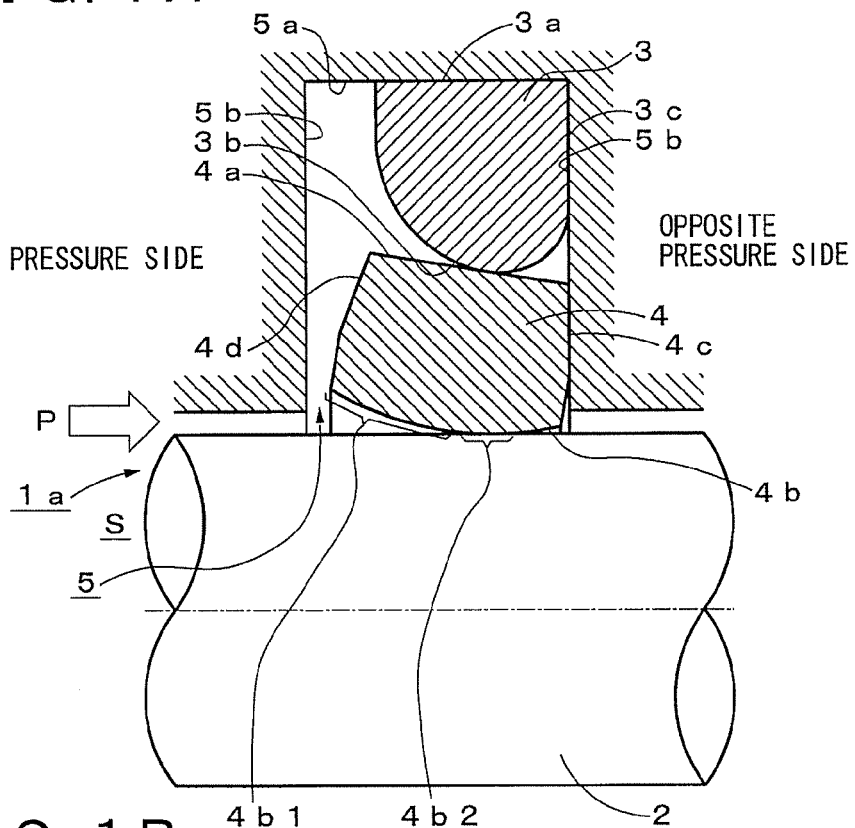
FIG. 1B is a partial sectional diagram of the embodiment of the sealing apparatus of the present invention illustrating a state of the backup ring and the seal ring while a fluid pressure is being applied.
Figure 2A:
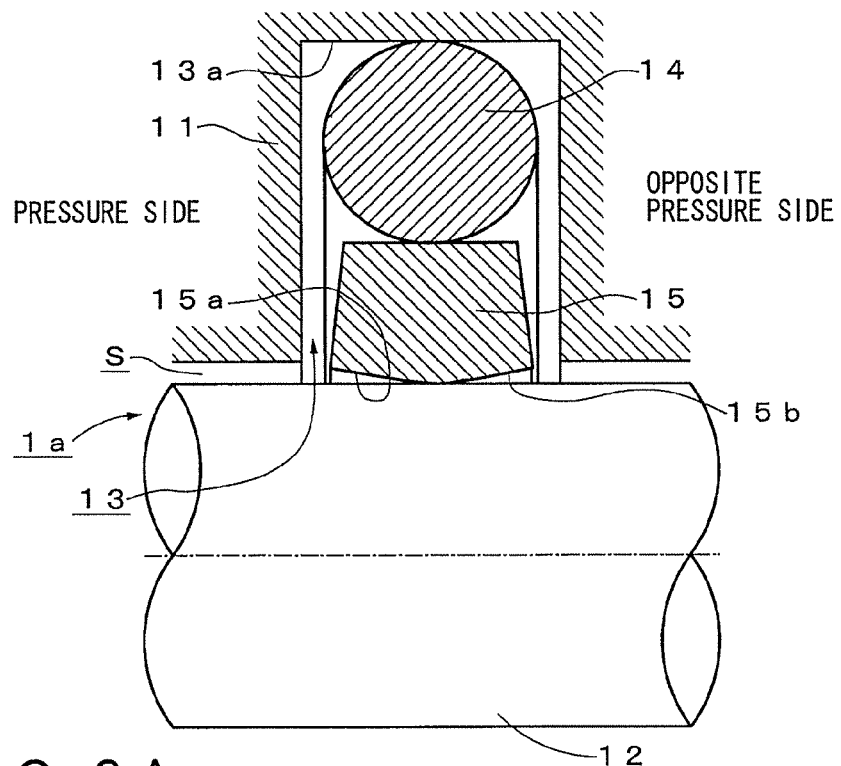
FIG. 2A is a partial sectional diagram of a sealing apparatus of the related art illustrating a state of a backup ring and a seal ring while a fluid pressure is not being applied.
Figure 2B:
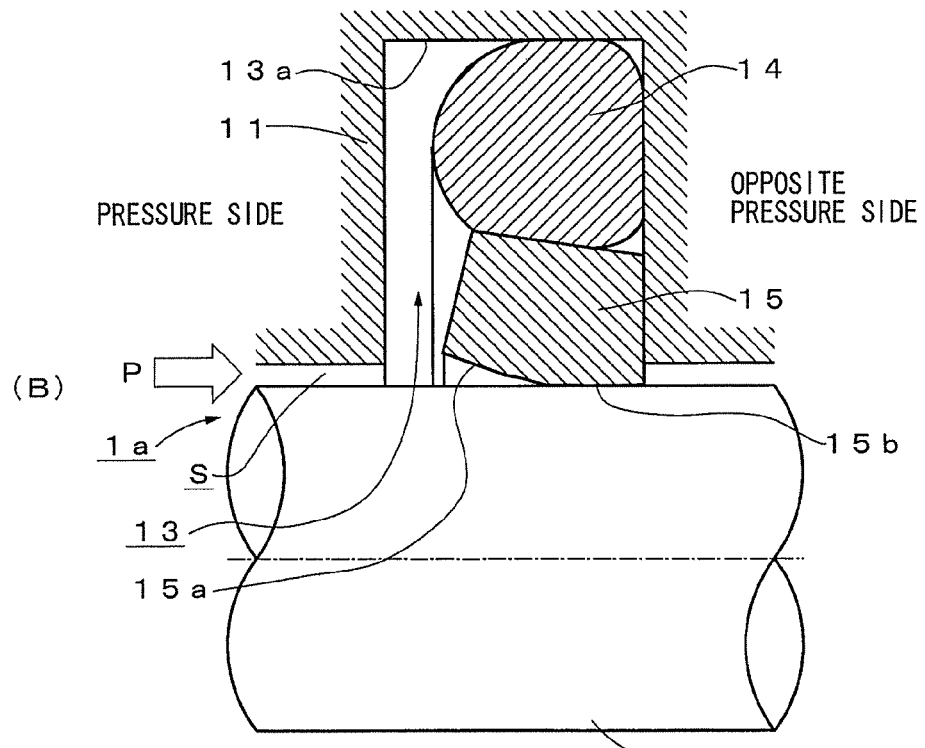
FIG. 2B is a partial sectional diagram of the sealing apparatus of the related art illustrating a state of the backup ring and the seal ring while a fluid pressure is being applied.

With the sealing apparatus of the aforementioned configuration, as shown in FIG. 1B, when a hydraulic pressure P is applied, the D-ring 3 and the seal ring 4 are pressed against the side surface 5b on an opposite pressure side of the annular groove for sealing 5. Also, the D-ring 3 is subject to an elastic compression due the hydraulic pressure P and, with its elastic recovering force, presses the seal ring 4 towards the shaft 2.

Since the seal ring 4 is configured in such a manner that its outer peripheral surface 4a is a surface having a cylindrical shape whereas its inner peripheral surface 4b is a toric convex surface having a constant radius of curvature in the axial direction, the seal ring 4 inclines by being subject to the hydraulic pressure P and the pressing force by the D-ring 3, and stabilizes at a position where an entirety of the tapered face 4c on the opposite pressure side is in surface contact with the side surface 5b on the opposite pressure side of the annular groove for sealing 5. The inner peripheral surface 4b of the seal ring 4 which is in contact with the shaft 2 is a toric convex surface having a constant radius of curvature in an axial direction, and by selecting this radius of curvature to be smaller than the axial-direction radius of curvature of the inner peripheral surface 3b of the D-ring 3, an inclining movement of the seal ring 4 to a stable position, which is caused by being subject to the hydraulic pressure P and the pressing force of the D-ring 3, is performed smoothly in a non-stepped manner. Then, with the hydraulic pressure P being exerted on a portion 4b1 of the inner peripheral surface 4b of the seal ring 4 where the operating oil comes into contact, a space between the portion 4b1 and the shaft 2 becomes larger and the area of contact between the seal ring 4 and the shaft 2 becomes smaller. As a result, a high sealing performance is ensured due to concentration of the pressing force of the D-ring 3 at a portion 4b2 of the seal ring 4 in contact with the shaft 2, and a reduction in the torque of the rotating portion can be achieved since a frictional resistance between the seal ring 4 and the shaft 2 becomes smaller.

Since the outer peripheral surface 3a of the D-ring 3 is a surface having a cylindrical shape, the operating oil is not allowed to enter between the D-ring 3 and the bottom surface 5a of the annular groove for sealing 5 even when the hydraulic pressure P is being applied, an entirety of the outer peripheral surface 3a of the D-ring 3 always remains in contact with the bottom surface 5a of the annular groove for sealing 5. Therefore, by always effectively causing the elastic recovering force of the D-ring 3 to act as the pressing force that urges the seal ring 4 towards the shaft 2, a stable sealing performance can be always achieved.

Also, when the hydraulic pressure P is being applied, since an end surface 3c of the D-ring 3 on the opposite pressure side comes into surface contact with the side surface 5b of the annular groove for sealing 5 on the opposite pressure side along an entire periphery, a frictional force between the D-ring 3 and the annular groove for sealing 5 increases. Thus, due to a peripheral-direction frictional force against the seal ring 4, the D-ring 3 can be prevented from rotationally sliding against the housing 1.

Also, since a ring made of resin of polyethylene or polyamide is employed as the seal ring 4, a wear of the D-ring 3 made of rubber due to the friction between the rings 3 and 4 can be minimized, and a durability of the seal ring 4 against a high fluid pressure and a slidability with respect to the shaft 2 can be ensured.

Also, since both end surfaces of the seal ring 4 are tapered faces 4c and 4d, the aforementioned effect can be achieved regardless of from which side of the axial direction the hydraulic pressure P is acting. Therefore, this sealing apparatus can be preferably used for the rotating portion of the hydraulic apparatus in which a direction of action of the hydraulic pressure P switches over during operation.

Also, the technical scope of the present invention is not limited to the aforementioned embodiment.

For example, in the aforementioned embodiment, the tapered faces 4c and 4c are formed on both end surfaces of the seal ring 4, but a tapered face may be provided on the end surface portion on the opposite pressure side only.

Also, in the aforementioned embodiment, a configuration has been illustrated in which the D-ring 3 and the seal ring 4 are installed in the annular groove for sealing 5 provided at the shaft hole 1a of the housing (one member) 1 and the seal ring 4 comes into contact with the shaft (other member) 2, but may also be preferably used for a configuration in which the D-ring and the seal ring are installed in an annular groove for sealing provided on the shaft (one member) 2 and the seal ring comes into contact with the shaft hole 1a in the housing (other member) 1.

LIST OF REFERENCE SIGNS 1 housing,
1a shaft hole,
2 shaft,
3 backup ring,
3a outer peripheral surface (contact surface against a bottom surface of an annular groove for sealing),
3b inner peripheral surface (contact surface against a seal ring),
4 seal ring,
4a outer peripheral surface (contact surface against a backup ring),
4b inner peripheral surface (contact surface against a shaft),
4c, 4d tapered faces,
5 annular groove for sealing,
5a bottom surface,
S gap

The invention claimed is:

1. A sealing apparatus for sealing an annular gap formed between two inner and outer members that coaxially rotate relative to each other, the sealing apparatus comprising:

a backup ring provided in contact with a bottom surface of an annular groove for sealing, the annular groove for sealing being formed along a peripheral direction in one of the members and having a rectangular cross section; and a seal ring provided on an opening side of the annual groove for sealing, the seal ring being in sliding contact with the other member through an entire periphery by being pressed by the backup ring and rotationally slidable relative to the other member, a single continuous contact surface of the backup ring against the bottom surface being a surface having a cylindrical shape and a contact surface of the backup ring against the seal ring being a toric convex surface having a constant radius of curvature in an axial direction, a contact surface of the seal ring against the backup ring being a surface having a cylindrical shape and a contact surface of the seal ring against the other member being a toric convex surface having a constant radius of curvature in an axial direction.

2. The sealing apparatus according to claim 1, wherein
the backup ring is a D-ring made of rubber; and
the seal ring is a resin ring made of one of polyethylene and polyamide.

3. The sealing apparatus according to claim 1, wherein an end surface of the seal ring has a tapered face which inclines in such a manner that a distance from a side surface of the annual groove for sealing becomes larger towards the bottom surface of the annual groove for sealing.

4. The sealing apparatus according to claim 2, wherein an end surface of the seal ring has a tapered face which inclines in such a manner that a distance from a side surface of the annual groove for sealing becomes larger towards the bottom surface of the annual groove for sealing.

* * * * *